US011003550B2

(12) United States Patent
Bulkowski et al.

(10) Patent No.: US 11,003,550 B2
(45) Date of Patent: May 11, 2021

(54) METHODS AND SYSTEMS OF OPERATING A DATABASE MANAGEMENT SYSTEM DBMS IN A STRONG CONSISTENCY MODE

(71) Applicants: Brian J. Bulkowski, Menlo Park, CA (US); Venkatachary Srinivasan, Sunnyvale, CA (US); Andrew Gooding, Mountain View, CA (US)

(72) Inventors: Brian J. Bulkowski, Menlo Park, CA (US); Venkatachary Srinivasan, Sunnyvale, CA (US); Andrew Gooding, Mountain View, CA (US)

( * ) Notice: Subject to any disclaimer, the term of this patent is extended or adjusted under 35 U.S.C. 154(b) by 103 days.

(21) Appl. No.: 16/179,997

(22) Filed: Nov. 4, 2018

(65) Prior Publication Data

US 2019/0196918 A1   Jun. 27, 2019

Related U.S. Application Data

(60) Provisional application No. 62/581,689, filed on Nov. 4, 2017.

(51) Int. Cl.
*G06F 11/14* (2006.01)
*G06F 16/27* (2019.01)

(52) U.S. Cl.
CPC .......... *G06F 11/1469* (2013.01); *G06F 16/27* (2019.01); *G06F 2201/80* (2013.01); *G06F 2201/82* (2013.01); *G06F 2201/84* (2013.01)

(58) Field of Classification Search
CPC ....... G06F 11/14; G06F 11/1469; G06F 16/27
USPC .......................................................... 714/19
See application file for complete search history.

(56) References Cited

U.S. PATENT DOCUMENTS

| | | | | |
|---|---|---|---|---|
| 9,984,140 | B1* | 5/2018 | Sukumaran | G06F 16/219 |
| 2004/0153473 | A1* | 8/2004 | Hutchinson | G06F 16/27 |
| 2006/0253856 | A1* | 11/2006 | Hu | G06F 9/526 |
| | | | | 718/104 |
| 2007/0061487 | A1* | 3/2007 | Moore | G06F 16/27 |
| | | | | 709/246 |
| 2012/0078974 | A1* | 3/2012 | Meijer | G06F 16/288 |
| | | | | 707/803 |
| 2012/0166390 | A1* | 6/2012 | Merriman | G06F 16/2365 |
| | | | | 707/613 |
| 2013/0036106 | A1* | 2/2013 | Lucas | G06F 16/27 |
| | | | | 707/703 |
| 2016/0188426 | A1* | 6/2016 | Kousha | G06F 16/182 |
| | | | | 714/4.12 |
| 2018/0004777 | A1* | 1/2018 | Bulkowski | G06F 16/27 |
| 2019/0146884 | A1* | 5/2019 | Gangadharappa | G06F 11/1464 |
| | | | | 711/162 |
| 2019/0235974 | A1* | 8/2019 | Pardon | G06F 11/2094 |
| 2019/0251006 | A1* | 8/2019 | Bulkowski | G06F 11/1474 |

* cited by examiner

*Primary Examiner* — Kamini B Patel

(57) ABSTRACT

In one aspect, a computerized method useful for operating a database management system DMBS DBMS in a strong consistency mode comprising includes the step of implementing an atomic transfer of a master node of the DMBS DBMS. The method includes the step of implementing a master node restriction, wherein the master node restriction guarantees no more than one master node is ever available. The information about a set of nodes participating in a cluster of the set node of the DMBS DBMS is maintained to allow a subset of nodes to determine that the one master node is a master of a subset of data stored in the cluster.

18 Claims, 9 Drawing Sheets

METHODS AND SYSTEMS OF OPERATING A DATABASE MANAGEMENT SYSTEM DBMS IN A STRONG CONSISTENCY MODE

CROSS-REFERENCE TO RELATED APPLICATIONS

This application claims priority to U.S. provisional patent application No. 62/581,689 filed on 4 Nov. 2017. This provisional patent application is hereby incorporated by reference in its entirety.

BACKGROUND

Related Art

A real-time operational database management system (DBMS) can be used for handling real-time mission-critical applications in the area of real-time bidding, fraud detection for online payments, continuous risk management for stock accounts, revenue assurance.

In many of these use cases the real-time operational DBMS can support up to a few million reads/writes per second focusing on primary key operations over a diverse record set. Low read latency, high write load, and high uptime can be important in these use cases and consistency need not be guaranteed. Therefore, the real-time operational DBMS can be prioritized availability over consistency during network partitioning events (e.g., split-brain) and the system works in AP (available and partition tolerant) mode as per the CAP theorem. The CAP theorem postulates that only two of the three properties of consistency, availability, and partition tolerance can be guaranteed in a distributed system at a specific time.

The real-time operational DBMS can be used to replace systems of record that contain critical transactional data, especially when they are used in real-time applications. Such systems of record need to prioritize consistency over availability during network partitioning events (e.g. split-brain event) and the real-time operational DBMS can operate in CP (consistent and partition tolerant) mode as per the CAP theorem. One issue with the real-time Operational DBMS can be focused on determining how much availability can be retained while providing strict consistency (e.g., linearize all read/write operations to the database) with a per-row atomicity guarantee. Since the real-time operational DBMS may be extremely fast already, a goal can be to ensure that the performance and most of the availability can be preserved while adding consistency support that linearizes all operations to the database. As expected, this goal can pose various technical challenges. The processes and system provided herein can be used to ameliorate this issue.

SUMMARY OF THE INVENTION

In one aspect, a computerized method useful for operating a database management system DMBS DBMS in a strong consistency rode comprising includes the step of implementing an atomic transfer of a master node of the DMBS DBMS. The method includes the step of implementing a master node restriction, wherein the master node restriction guarantees no more than one master node is ever available. The information about a set of nodes participating in a cluster of the set node of the DMBS DBMS is maintained to allow a subset of nodes to determine that the one master node is a master of a subset of data stored in the cluster. The method includes the step of implementing a hybrid clock in the DBMS. The method includes the step of implementing a replication integrity policy. The replication integrity policy guarantees a strict consistency between the set of nodes and maintains replication integrity using a redo mechanism to ensure that no read operations or write operations are allowed when replicas are in an unknown state. The method includes the step of implementing a client intelligence operation. The client intelligence function ensures that each read operation and write operation remains linearizable. A client participates by tracking each partition state from the cluster; and combining an atomic transfer of a master node, a master restriction information, a hybrid clock, a replication integrity, and a client intelligence such that all read operations and write operations to the database are linearized.

Figure 1:
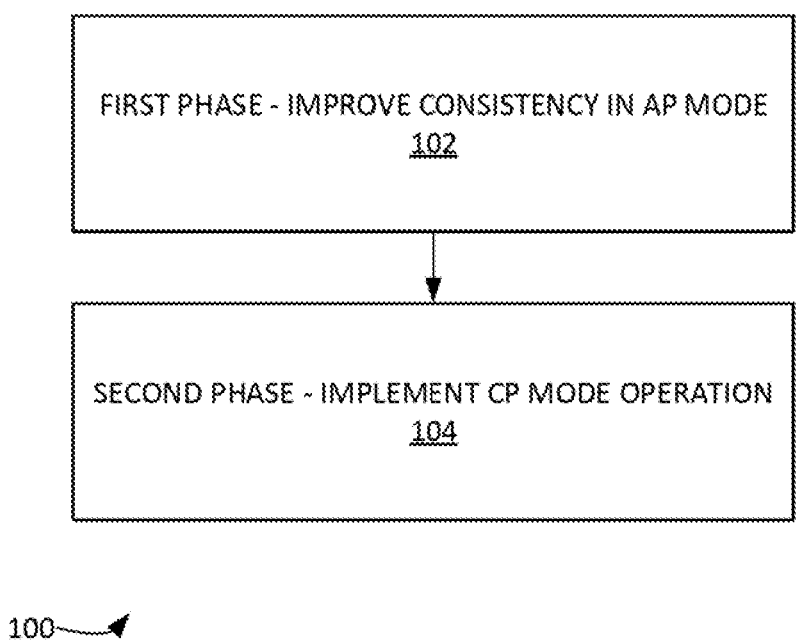
FIG. 1 illustrates an example process of managing consistency and availability tradeoffs in a real-time operational DBMS, according to some embodiments.

The Figures described above are a representative set and are not an exhaustive with respect to embodying the invention.

DESCRIPTION

Disclosed are a system, method, and article of manufacture of operating a database management system DMBS DBMS in a strong consistency mode. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention.

Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

CAP Theorem postulates that only two of the three properties of consistency, availability, and partition tolerance can be guaranteed in a distributed system at a specific time. Since availability is paramount in most deployments, the system can either provide consistency or partition tolerance. It is noted, however, that these three properties are more continuous rather than binary.

Dynamic random-access memory (DRAM) can be a type of random-access memory that stores each bit of data in a separate capacitor within an integrated circuit.

Solid-state drive (SSD) can be a data storage device using integrated circuit assemblies as memory to store data persistently.

Split-brain can indicate data and/or availability inconsistencies originating from the maintenance of two separate data sets with overlap in scope (e.g. because of servers in a network design; a failure condition based on servers not communicating and synchronizing their data to each other; etc.).

Tombstone can be a sign in a replica that information has been deleted.

Exemplary Methods

An example mechanism for deleting records is now discussed.

FIG. 1 illustrates an example process 100 of managing consistency and availability tradeoffs in a real-time operational DBMS, according to some embodiments. Process 100 can ensure that the performance and most of the availability can be preserved while adding consistency support that linearizes all operations to the database. As expected, process 100 implements this in two phases/steps. In a second phase 104, process 100 can implement CP mode operation. Process 300 infra provides an example of aspects of implementing CP mode in a real-time operational DBMS.

Figure 2:
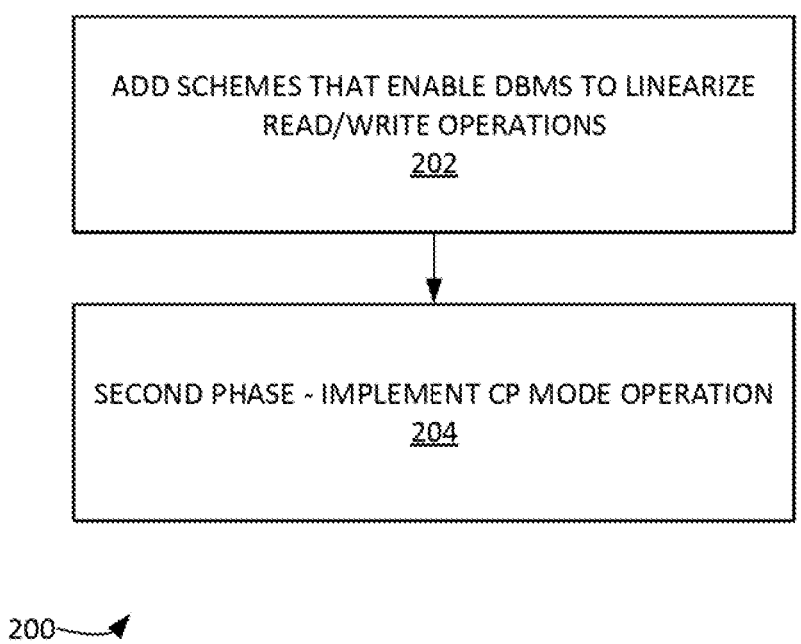
FIG. 2 illustrates an example process for improve improve consistency in an AP mode, according to some embodiments.

More specifically, in step 102, process 100 can improve consistency in an AP mode using process 200 of FIG. 2. Consistency in AP mode can be implemented by adding schemes that enable a real-time operational DBMS to linearize read/write operations in all except two situations. The first situation can be when a split-brain partition occurs on the cluster. The second situation can be when a number of nodes (e.g. more than the replication count) are simultaneously lost due to failures. It is noted that in AP mode, availability of the system is not compromised since at least one master for every data item is available in the database cluster (e.g. a set of nodes) at all times (e.g. even during network partitions). Process 200 can provide the maximum possible level of consistency in AP mode. For example, the system does not lose writes during rolling upgrades and other failure situations short of the two explicitly called out above.

Figure 3:
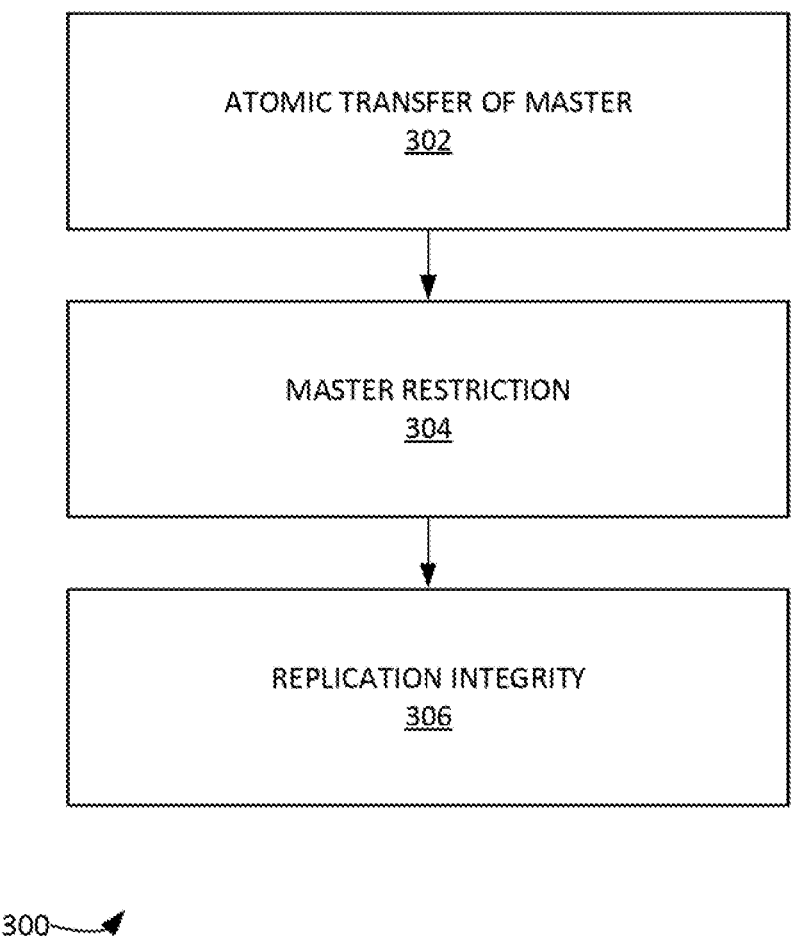
FIG. 3 illustrates an example process of implementing CP mode in a real-time operational DBMS, according to some embodiments.

FIG. 3 illustrates an example process 300 of implementing CP mode in a real-time operational DBMS, according to some embodiments. In step 302, process 300 can implement an atomic transfer of master node. For example, in a distributed database system, the issue of transfer of master from one node to another is important during various failure situations. Process 300 can ensure that there is, at most, one master node for a specific data item at all times.

In step 304, process 300 can implement master restriction. To ensure that no more than one master is ever available, information about the nodes participating in the database cluster can be maintained to allow a subset of nodes to determine with certainty whether it may master subsets of the data.

In step 306, process 300 can implement replication integrity. To guarantee strict consistency, process 300 maintains replication integrity, using a redo mechanism, to ensure that no reads/writes are allowed when replicas are in an unknown state.

It is noted that the atomic transfer of master, master restriction and replication integrity together guarantee that the read and write operations to the database are linearized. A trade-off may exist between complexity of the scheme and degree of availability. For example, the more available a system then the higher the complexity of implementation can be. Specifically, during two-way split-brain situations, process 300 can make the data available somewhere in the cluster, while preserving consistency. For split-brains this can result in more than one cluster. It is noted that, in some cases, availability can reduce in a graceful manner, as the number of split-brain components increases. Process 300 can add these consistency features without significant impact on the straight-line performance in the system. It is noted that the real-time operational DBMS can manage a flash-optimized in-memory NoSQL database and/or other database systems such as those provided infra.

Exemplary Computer Architecture and Systems

Figure 4:
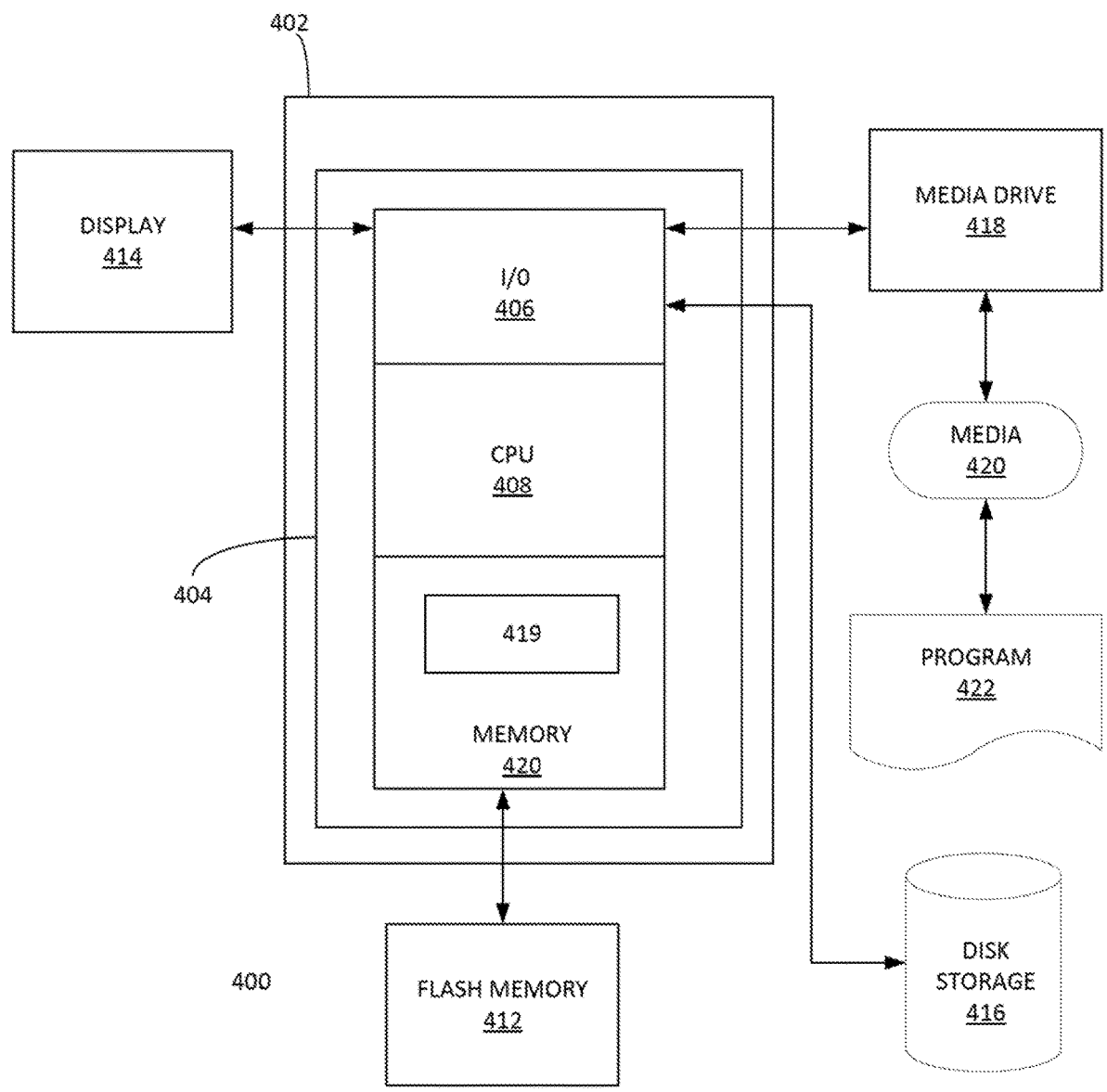
FIG. 4 is a block diagram of a sample-computing environment that can be utilized to implement various embodiments.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 5:
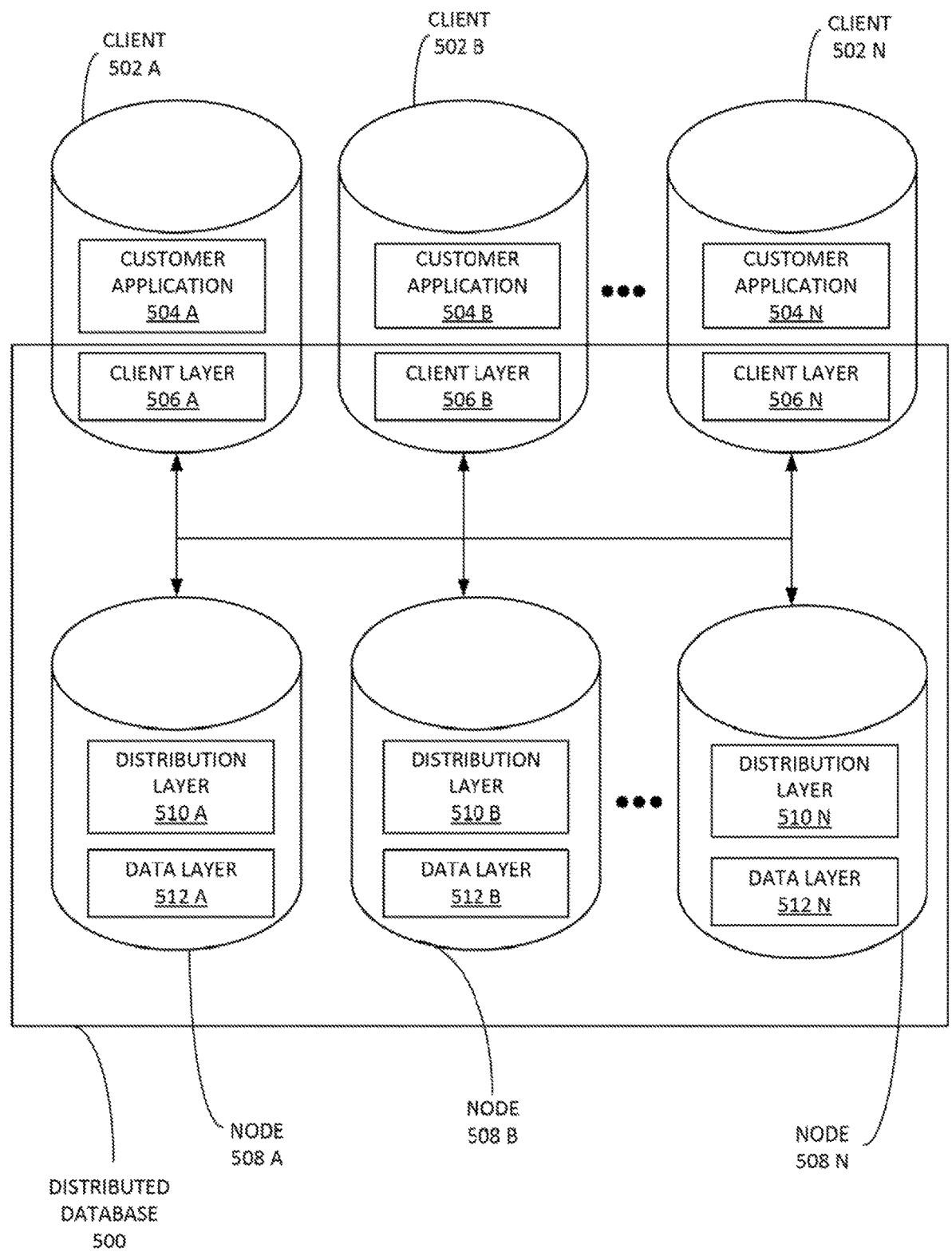
FIG. 5 shows, in a block diagram format, a distributed database system operating in a computer network according to an example embodiment.

FIG. 5 shows, in a block diagram format, a distributed database system (DDBS) 500 operating in a computer network according to an example embodiment. In some examples, DDBS 500 can be an Aerospike® database. DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non-transparent bridges, etc.). In some examples, some paths between entities can be implemented with Transmission Control Protocol (TCP), remote direct memory access (RDMA) and the like.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track cluster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, Isolation, and Durability.

Atomicity. A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the cluster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format to reduce memory factors, the system can be configured to use low level access to the physical storage media to further improve performance and the likes.

In some embodiments, cluster nodes 508 A-N can be an Aerospike Smart Cluster™. Cluster nodes 508 A-N can have a shared-nothing architecture (e.g. there is no single point of failure (SPOF)). Every node in the cluster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically).

Auto-discovery. Multiple independent paths can be used for nodes discovery—an explicit heartbeat message and/or via other kinds of traffic sent to each other using the internal cluster inter-connects. The discovery algorithms can avoid mistaken removal of nodes during temporary congestion. Failures along multiple independent paths can be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution. Once consensus is achieved and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication. The replication factor can be configurable. For example, a deployment uses a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, the cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing. DDBS 500 and cluster nodes 508 A-N can be self-healing. If a node fails, requests can be set to automatically fail-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Paxos consensus algorithm).

DDBS 500 can have a Shared-Nothing architecture: every node in an Aerospike cluster is identical, all nodes are peers and there is no single point of failure. Data is distributed evenly across nodes in a cluster using a Smart Partitions algorithm.

It is noted that in an operational database, the fastest and most predictable index can be the primary key index. This index can provide the most predictable and fastest access to row information in a database. The primary key index can be a blend of distributed hash table technology with a distributed tree structure in each server. In one example, the entire keyspace in a namespace (e.g. a database) can be partitioned using a robust hash function into partitions. There can be total of 4096 partitions and are equally distributed across nodes in the cluster. At the lowest level, a red-black in-memory structure can be used, similar to the data structures used in a MemCache system. The primary Index can be on the twenty (20) byte hash (e.g. also called digest) of the specified primary key. While this expands the key size of some records (which might have, for example, a unique eight (8) byte key), it can be beneficial because the code works predictably regardless of input key size, or input key distribution.

Secondary indexes can be on the non-primary key, which gives the ability to model one to many relationships. Indexes are specified on a bin-by-bin (like columns in an RDBMS) basis. This can allow efficient updates and minimizes the amount of resources required to store the indexes. A data description language (DDL) can be used to determine which bins and type are to be indexed. Indexes can be created and removed dynamically through provided tools or the API.

Additional techniques for AP mode implementation are now provided. DDBS 500 can setup cluster nodes that are tightly coupled so that partitions are virtually impossible to create. This means that a replicated database cluster of DDBS 500 can provides high consistency and high availability during node failures and restarts so long as the database cluster does not split into separate partitions. The following techniques can be utilized to minimize network-based partitioning.

Fast and robust heartbeats can be implemented. The heartbeats can be sent at a regular/periodic pace. In one embodiment, the cluster nodes can be expected to be close to each other thus requiring less than millisecond latency for node-to-node heartbeat messages. Heartbeats can be sent on UDP (e.g. in multicast mode) or on TCP (e.g. mesh mode). On top of this, DDBS 500 can implement a secondary heartbeat mechanism where the data transfer can augment the primary heartbeats. So, even if the primary heartbeat fails, if there are continuous read/write operations in the database, the cluster will be held together.

Consistent Paxos-based cluster formation can be implemented. DDBS 500 can use a fast Paxos-based algorithm to coalesce the database cluster. A short heartbeat interval can be implemented since it enables the Paxos based algorithm to discover node arrivals and node departures quickly and then re-coalesce the new database cluster within tens of milliseconds. In practice, a short-term unavailability during database cluster formation can preserve consistency.

DDBS 500 can provide high performance results in smaller database clusters. By using high capacity SSDs, each node of the database cluster can hold and serve data while maintain the size of the cluster relatively small. In one optional embodiment, database cluster nodes can be connected using the same switch with an adequate fail-safe backup. In addition to avoiding network partitioning, DDBS 500 can use additional techniques that ensure consistency during node failures and rolling upgrades.

Single node failures can be handled by DDBS 500 as follows. When using replication factor>=2, if a single node fails then the remaining nodes can have all the data of the cluster. DDBS 500 can implement automatic rebalancing (e.g. via migration) of the data between the surviving nodes. While the migration is being implemented, DDBS 500 can allow writes to continue. To make sure that no writes are lost in a race condition between the act of re-balancing and accepting writes, DDBS 500 can maintain a journal of changes that will be reapplied, after proper checks, at the end of a partition's migration.

Rolling upgrades can be implemented in DDBS 500. It is noted that software can be upgraded in more number of cases (thereby necessitating a node down) than the case of unplanned failure of the nodes. This is a non-issue with DDBS 500 because of how DDBS 500 handles single node failure cases very gracefully without any data loss, as explained above.

DDBS 500 can implement transaction repeatable read settings. When multiple nodes have merged into a database cluster (e.g. in a short amount of time), there may be many copies of the record created in the cluster. However, only one version of the record is the correct one. To overcome such a scenario, DDBS 500 can provide a configuration option to enable repeatable read. For every read operation, when repeatable read is enabled, DDBS 500 can consult all nodes in the cluster that claim to have data belonging to the partition, pick the most recent record (e.g. a correct record), and return it to the client. The system can continue to use this merge algorithm during read operations until all the copies of a partition are merged as part of the migration process. Accordingly, there cannot be a situation where different read requests will return different versions of the data (e.g. repeatable read requires this).

In the event the replica node communicates back an error, the write can be retried as the prole can fail only due to temporary reasons such as, inter alia: timeout or running out of disk space (which is continuously garbage collected). In one example, in which a prole did not communicate back anything to the master and the network connection is lost. The master may not know if the record was successfully written or not. In this case, the client can receive an "unknown" transaction state back.

One example of implementing DDBS 500 in CP mode is now provided. In CP mode, when a database cluster splits into two or more active clusters, availability may be sacrificed. For example, the minority quorum(s) can be made to halt. This action can prevent a client from receiving inconsistent data, but can also reduce availability. DDBS 500 smart clients can also be made to detect cluster-partitioning occurrences and act appropriately to restrict access to exactly one of the partitions. In this scenario, per the CAP theorem, DDBS 500 can prioritize consistency over availability, in order to allow for partition-tolerance. There can be use cases where availability can be sacrificed and a CP system is needed. To enable DDBS 500 to be used in more domains, a configuration for operating the cluster in CP mode can be implemented in addition to the AP. The actual mode of an individual cluster can be configurable by the operator based on their needs.

As part of a CP mode, DDBS 500 can support a static cluster size. The static cluster concept works as follows. The idea of a static cluster can refer to predefining the nodes of a database cluster. A system administrator ca be allowed to specify the exact set of cluster nodes and engage a "static-cluster" switch so that the composition of the cluster is fixed to include exactly all of the current nodes of the cluster. While the static-cluster switch is engaged, any cluster state change may not automatically result in changes to the partition map. The partition map determines how master and replicas of partitions are stored in nodes. For example, the partition map can be fixed and no migration of data is allowed whenever the static cluster switch is engaged. The operator can disengage the static-cluster switch before the cluster configuration can be changed in a controlled manner to add or remove nodes. The operator can then wait for all migrations to be completed before reengaging the static-cluster switch. If the cluster is split into one or more islands, and if the client sends a request to one of the nodes in an island, the following steps can be taken. If the request is a read request, and one of the nodes in the island has a copy of the data, the read request can be serviced. If the request is a write request, and the node is the master (and/or the master is in the island), it can perform the write only if all the replicas are in the same island. It is noted that when there is network based cluster partitioning, it is normally one or a very few nodes that become separated. In one scenario, where only one node gets separated from its cluster, only 1/nth of the data is unavailable for writes (e.g. where n is the number of nodes in the cluster). This may be quite acceptable in order to obtain full consistency in the presence of partitions. Larger sized islands may form if the nodes are connected through a hierarchy of switches and the intermediate (non-leaf) switch fails. Accordingly, the nodes DDBS 500 can be connected to the same switch, if possible. However, it is not mandatory.

Additional Processes

Figure 6:
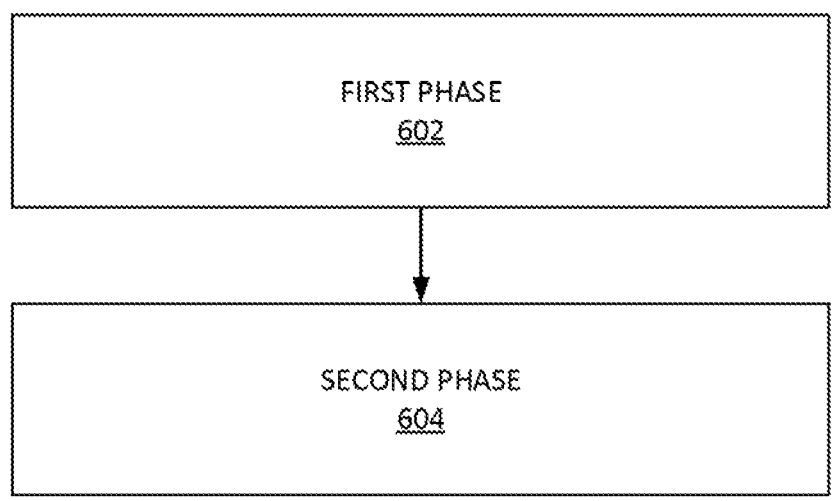
FIG. 6 illustrates an example process for maintaining consistency in a real-time DMBS DBMS, according to some embodiments.

FIG. 6 illustrates an example process 600 for maintaining consistency in a real-time DMBS DBMS, according to some embodiments It is noted that read/write operations on a single record can be made strictly linearizable (e.g. preserving sequential read/write accesses to a record in multiple concurrent execution threads across the entire system) and/ or be made session consistent (i.e. sequential consistency). Session consistency can preserve sequential read/write accesses to a record during a single user or client session. In addition to providing correctness guarantees on single row operations, process 600 can preserve as much availability as possible during failures. Process 600 can be implemented in two phases 602 and 604.

In phase 602, process 600 can improve consistency as much as possible in an AP mode by adding schemes that enable the DMBS DBMS system to linearize read/write operations in all except two situations: when a split-brain partition occurs on the cluster, and when a number of nodes at or more than the replication count are simultaneously lost due to failures. Process 700 of FIG. 7 infra provides additional implementations of phase 602.

In phase 604, process 600 cause the DMBS DBMS system to operate in a strong consistency mode. Process 800 of FIG. 8 infra provides additional implementations of phase 604.

Figure 7:
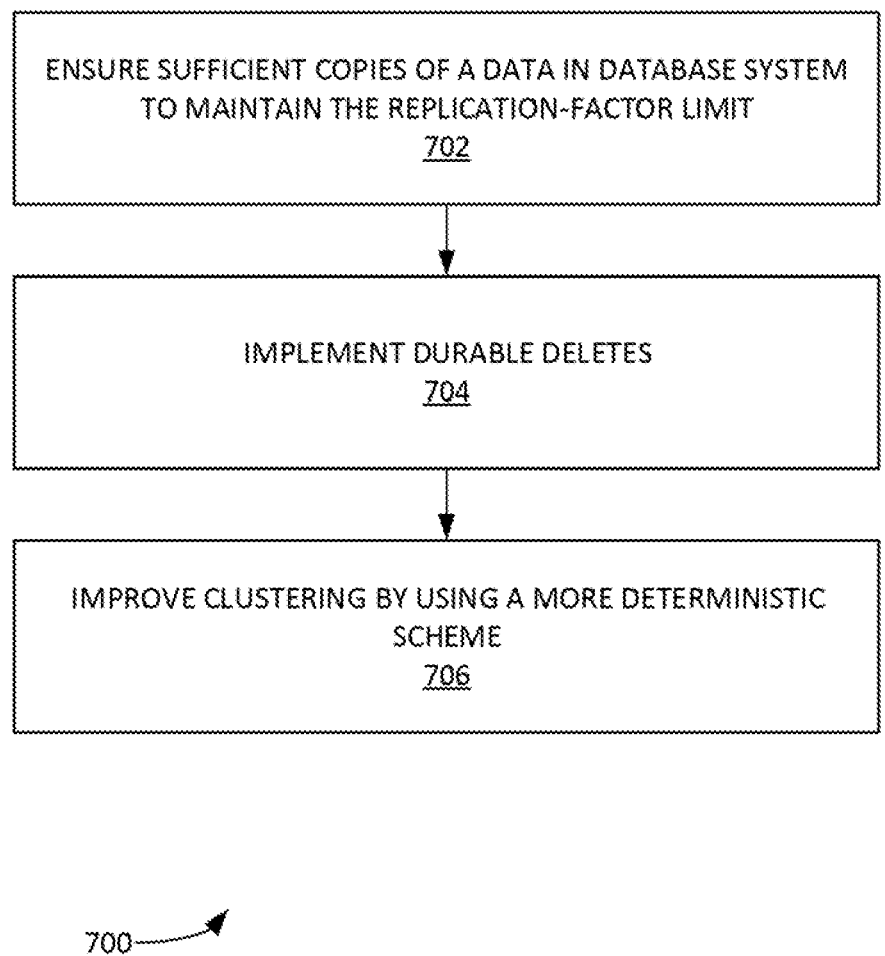
FIG. 7 illustrates an example process for improving consistency in an AP mode of a DMBS DBMS, according to some embodiments.

FIG. 7 illustrates an example process 700 for improving consistency in an AP mode of a DMBS DBMS, according to some embodiments. In step 702, process 700 can improve consistency during failures by ensuring there are always enough copies of a data in the system to maintain the replication-factor limit. Partition copies can be retained on node additions until the new location of the partition is fully available.

In step 704, process 700 can improve durability by implementing Durable Deletes that use tombstone entries to persistently store meta-data on recently deleted records. This can enable both a policy of expunging data from indexes and a tombstone-based methodology. Durable deletes can provide the atomicity and durability guarantees on changes to database records, including inserts, updates and deletes.

In step 706, process 700 can improve clustering by using a more deterministic scheme. In this scheme, members of a cluster and cluster formation can be implemented through much more optimized and precise levels of protocol among the nodes in cluster. This enables more controlled situations of splits, single-node failures, etc. and can reduce the amount of data transferred between nodes during cluster change events.

It is noted that, in availability mode, availability of the DMBS DBMS system for writes is not compromised as at least one master for every data item is available in the cluster (even during network partitions). By choosing an availability mode, conflicting writes are accepted during certain failure situations. However, when the system is not undergoing a split brain, the DMBS DBMS can provide a fairly high level of consistency in availability mode.

Figure 8:
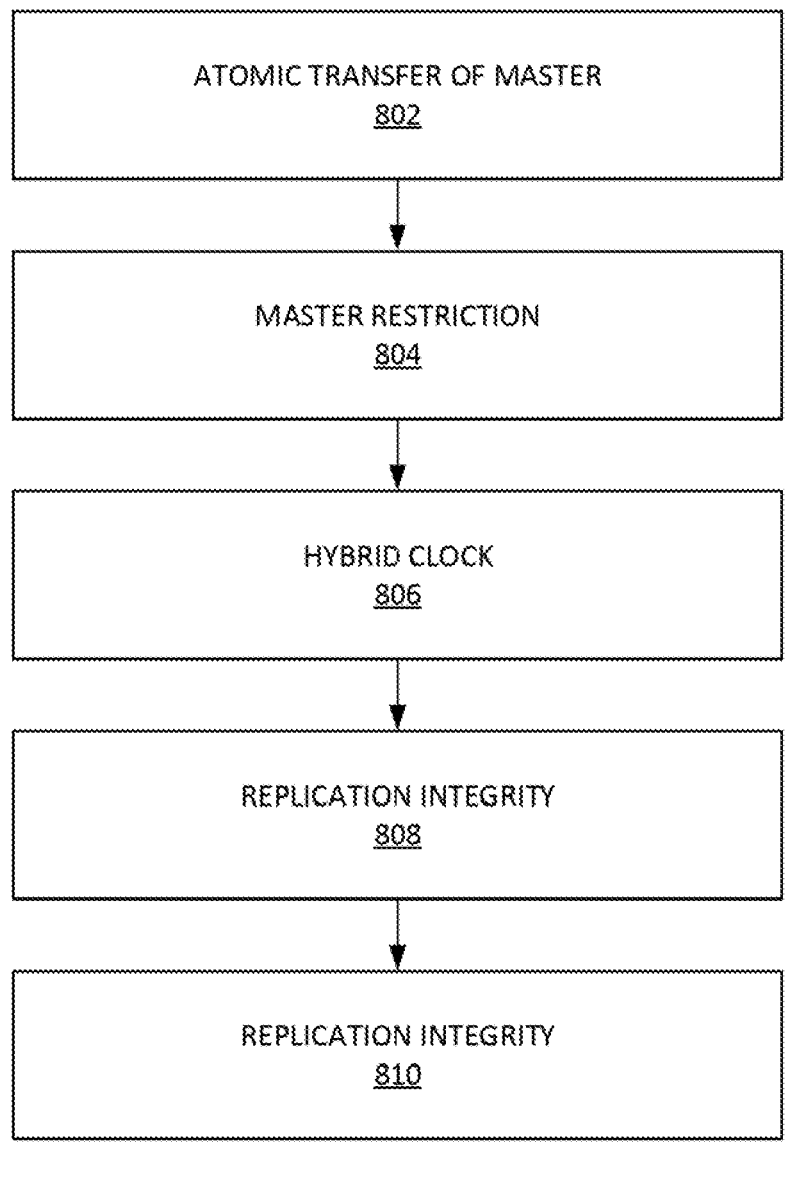
FIG. 8 illustrates a process for operating a DMBS DBMS in a strong consistency mode, according to some embodiments.

FIG. 8 illustrates a process 800 for operating a DMBS DBMS in a strong consistency mode, according to some embodiments.

In step 802, process 800 can implement an atomic transfer of a master node. In a distributed system, the issue of transfer of master from one node to another is utilized during failure situations. Step 802 can ensure that there is, at most, one master for a specific data item at all times.

In step 804, process 800 can implement master node restriction. In one example, to guarantee no more than one master is ever available, information about the nodes participating in the cluster can be maintained to allow a subset of nodes to determine with certainty whether it may master subsets of the data.

In step 806, process 800 can implement a hybrid clock. For example, a master transition, even when the handoff is atomic and ordered through network interaction, a clock which is both high performance and results in ordered writes can be utilized. By combining an element which changes as master ownership changes, as well as the local clock value of that node, and finally a sub-millisecond counter, process 800 can implement a hybrid clock. The hybrid clock can enable, at an example level of granularity, thirty (30) seconds of clock drift and million-write per second per key capacity. The DMBS DBMS heartbeat system can detect clock drift, thus not fully depending on external clock synchronization mechanisms.

In step 808, process 800 can implement replication integrity. For example, to guarantee strict consistency, the step 808 can maintain replication integrity using a redo mechanism to ensure that no reads/writes are allowed when replicas are in an unknown state.

In step 810, process 800 can implement client intelligence. For example, to ensure that read and writes stay linearizable (both session and global), a client participates by keeping track of partition states from the cluster (called regime and based on clusters forming based on nodes joining and departing the cluster).

In step 812, process 800 can combine the atomic transfer of master, master restriction, hybrid clock, replication integrity, and client intelligence together to guarantee that all read and write operations to the database are linearized.

Figure 9:
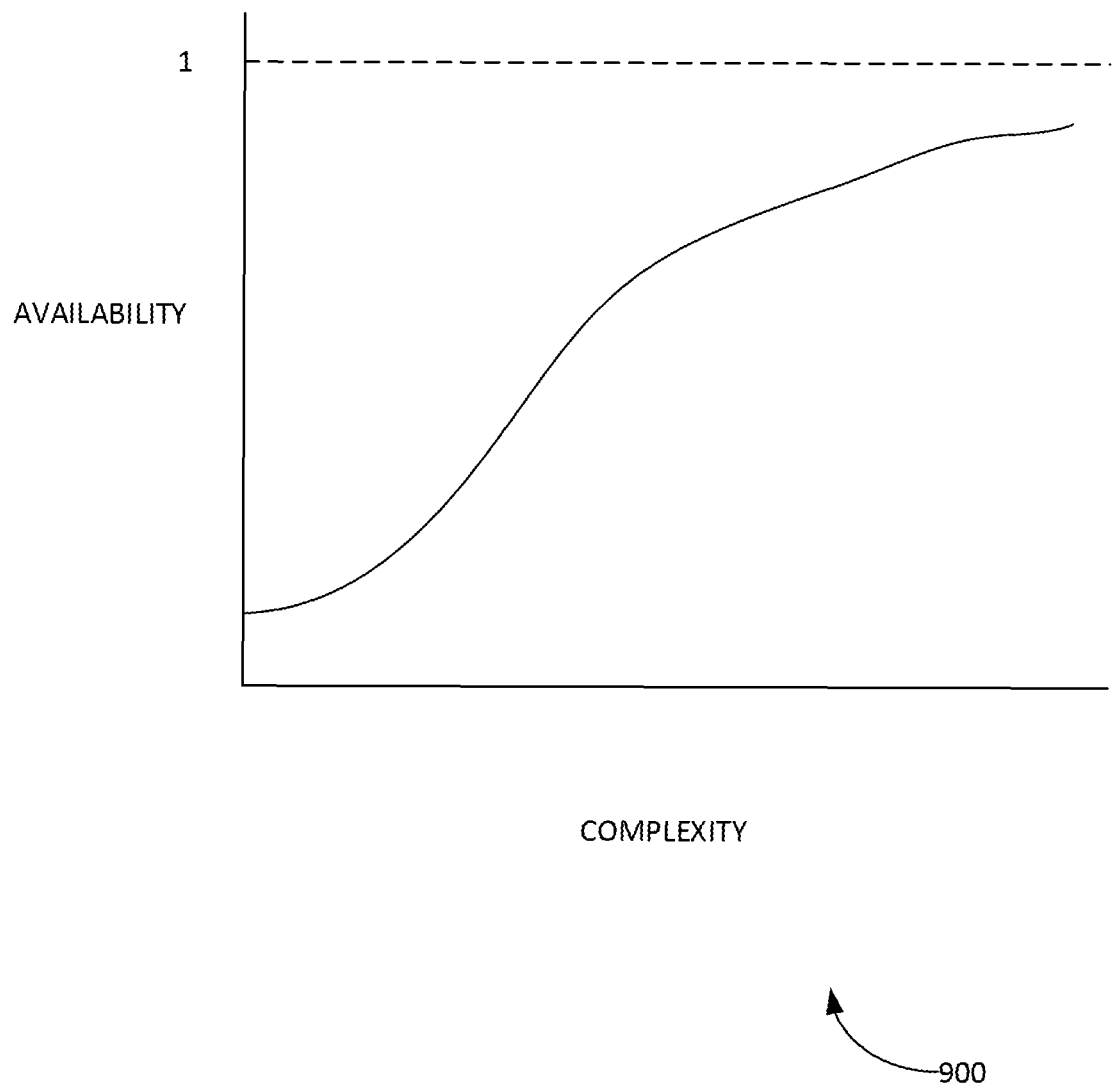
FIG. 9 illustrates a tradeoff between complexity of a scheme and degree of availability, according to some embodiments.

FIG. 9 illustrates a tradeoff between complexity of a scheme and degree of availability, according to some embodiments. For example, the more available a strongly consistent system, the higher the complexity of implementation. In one embodiment, a simple implementation of a strongly consistency mode can block all reads and writes to the system whenever any of the cluster nodes are not available (e.g. the cluster is not whole). A simple rolling upgrade that takes down one node at a time to upgrade software (e.g. a routine operation) can result in a complete loss of availability. The DMBS DBMS can maintain both availability and consistency during minor hardware outages or planned maintenance.

The DMBS DBMS can have factors to ensure that we had a high level of operational ease of use during such situations. The applied factors implemented during a software upgrade are now discussed. Upgrades can be implemented by taking down one cluster node at a time, updating the software on the node, and bring it back into the cluster (e.g. a rolling upgrade). This implies that a node running the previous software version and another one running the upgraded software version can coexist in the same cluster during the rolling upgrade with no loss in database service. In one example, when a node is taken down for a rolling upgrade, there can be no loss of availability of any data in the cluster for reads and writes (this assumes a replication factor of two (2) or more). When a node returns to the cluster after the upgrade, the next node in the rolling upgrade list can be taken down immediately while preserving strong consistency.

Factors when nodes are added/removed from the cluster are now discussed. For node additions, operational procedures need to be simple and should allow multiple new nodes to be added to the cluster at the same time. For node removals (not failures), the operational procedures can be a bit more complex. For example, removing nodes from a cluster needs to be done a bit more carefully especially if the system has only two copies of data.

Higher complexity can provide higher availability (see FIG. 9). The DMBS DBMS can implement a system that preserves the following invariants (to be improved with time).

For sunny day scenarios, (situations without ongoing hardware failures or network congestion) the DMBS DBMS can preserve much of its high-performance present in availability mode in the strong consistency mode as well. In one example, the DMBS DBMS can works as follow. For session linearizability or sequential consistency, in a two-copy setup, the DMBS DBMS can execute reads/writes with the same highest performance that can obtain in AP mode.

For session linearizability or sequential consistency, as the number of copies becomes larger, some overhead during sunny-side processing of writes only, mostly in terms of additional network requests (e.g. metadata only) for two-phase transaction coordination between replicas of a single record for writes. This can be to provide a proper commit time for the transaction that changes a record and keeps it consistent across all the record's copies within the cluster. Reads can still be at the highest performance levels independent of number of copies.

For strict linearizability, there is an additional overhead for coordinating reads within the cluster by consulting all the copies of the record (e.g. for metadata only). This can be used to ensure that reads across clients are globally ordered across time.

For rainy day scenarios, when a cluster splits into two or more split brains, the DMBS DBMS can make various levels of data available without compromising the linearizability guarantees. In one example, the DMBS DBMS can, during two-way split-brain situations, make all the data available somewhere in the cluster, while preserving consistency. As the number of split-brains increases to three or more, subsets of data (e.g. partitions) become unavailable in a graceful degradation of availability as the situation becomes more and more complex. Lastly, the DMBS DBMS can add these consistency features without significant impact on the straight-line performance in the system.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for maintaining consistency in a real-time database management system (DBMS) comprising: determining that the real-time DBMS system is in an AP (available but not consistent under network partitions) mode; improving consistency of the real-time DBMS system in the AP mode by adding specified schemes that enable the real-time DBMS system to linearize a set of read operations and a set of write operations in all except two situations, wherein a first situation comprises detecting a split-brain partition has occurred in a cluster of the real-time DBMS, and wherein a second situation comprises detecting that a number of nodes are at or more than a replication count are simultaneously lost due to a set of node failures; and setting the DBMS system to operate in a strong consistency mode.

2. The computerized method of claim 1, wherein each read operation and write operation on a single record is made strictly linearizable by preserving a sequential read/write access to the record in a plurality concurrent execution threads across the real-time DBMS.

3. The computerized method of claim 1, wherein a session consistency preserves a sequential read; write accesses to the record during a single user or client session.

4. The computerized method of claim 1, further comprising: improving a consistency during a failure by ensuring there are enough copies of a data in the real-time DBMS to maintain a replication-factor limit, and wherein each a partition copy is retained on a node additions until a new location of the partition is fully available.

5. The computerized method of claim 1 further comprising: improving a durability value of the real-time DBMS by implementing as set of durable deletes, wherein a durable delete uses a tombstone entry to persistently store meta-data on recently deleted records.

6. The computerized method of claim 1 further comprising: improving a clustering operation by using a deterministic scheme, wherein the deterministic scheme.

7. The computerized method of claim 1, wherein, in an availability mode, the real-time DBMS system writes are not compromised as at least one master for every data item is available in the duster.

8. A computerized system useful for operating a database management system DBMS in a strong consistency mode comprising: at least one processor configured to execute instructions; at least one memory containing instructions when executed on the at least one processor, causes the at least one processor to perform operations that: implement an atomic transfer of a master node of the DBMS; implement a master node restriction, wherein the master node restriction guarantees no more than one master node is ever available, and wherein information about a set of nodes participating in a cluster of the set node of the DBMS is maintained to allow a subset of nodes to determine that the one master node is a master of a subset of data stored in the cluster; implement a hybrid clock in the DBMS; implement a replication integrity policy, wherein the replication integrity policy guarantees a strict consistency between the set of nodes and maintains replication integrity using a redo mechanism to ensure that no read operations or write operations are allowed when replicas are in an unknown state; implement a client intelligence operation, wherein the client intelligence function ensures that each read operation and write operation remains linearizable, and wherein a client participates by tracking each partition state from the cluster; and combine an atomic transfer of a master node, a master restriction information, a hybrid clock, a replication integrity, and a client intelligence such that all read operations and write operations to the database are linearized.

9. The computerized system of claim 8, wherein an issue of transfer of master from one node to another is utilized during failure situations.

10. The computerized system of claim 9, wherein a master transition is implemented, and wherein the hybrid clock in the DBMS is set to a specified level of granularity.

11. The computerized system of claim 10, wherein the specified level of granularity is set to, thirty (30) seconds of clock drift and million-write per second per key capacity.

12. The computerized system of claim 10, wherein a DBMS heartbeat system is provided, and wherein the DBMS heartbeat system detects drift in the hybrid dock such that the DBMS does not depend on an external clock synchronization mechanism.

13. The computerized system of claim 10, wherein the memory containing instructions when executed on the at least one processor, causes the at least one processor to perform operations that: implement a client intelligence operation, wherein the client intelligence operation ensures that each read operation and write operation remains linearizable.

14. A computerized method useful for operating a database management system DBMS in a strong consistency mode comprising: implementing an atomic transfer of a master node of the DBMS; implementing a master node restriction, wherein the master node restriction guarantees no more than one master node is ever available, and wherein information about a set of nodes participating in a cluster of the set node of the DBMS is maintained to allow a subset of nodes to determine that the one master node is a master of a subset of data stored in the cluster; implementing a hybrid clock in the DBMS; implement a replication integrity policy, wherein the replication integrity policy guarantees a strict consistency between the set of nodes and maintains replication integrity using a redo mechanism to ensure that no read operations or write operations are allowed when replicas are in an unknown state; implementing a client intelligence operation, wherein the client intelligence function ensures that each read operation and write operation remains linearizable, and wherein a client participates by tracking each partition state from the cluster; and combining an atomic transfer of a master node, a master restriction information, a hybrid clock, a replication integrity and a client intelligence such that all read operations and write operations to the database are linearized.

15. The computerized method of claim 14, wherein an issue of transfer of master from one node to another is utilized during failure situations.

16. The computerized system of claim 14, wherein a master transition is implemented, and wherein the hybrid clock in the DBMS is set to a specified level of granularity.

17. The computerized system of claim 14, wherein the specified level of granularity is set to, thirty (30) seconds of clock drift and million-write per second per key capacity.

18. The computerized system of claim 14, wherein a DBMS heartbeat system is provided, and wherein the DBMS heartbeat system detects drift in the hybrid clock such that the DBMS does not depend on an external clock synchronization mechanism.

* * * * *